June 2, 1925.                                                              1,540,533
C. F. BULLOCK
FLOW METER INSTALLATION
Filed Nov. 8, 1924

Inventor:
Charles F. Bullock,
by Alexander F. ____
His Attorney.

Patented June 2, 1925.

1,540,533

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

FLOW-METER INSTALLATION.

Application filed November 8, 1924. Serial No. 748,781.

*To all whom it may concern:*

Be it known that I, CHARLES F. BULLOCK, a citizen of the United States, residing at Schenectady, in the county of Schenectady, State of New York, have invented certain new and useful Improvements in Flow-Meter Installations, of which the following is a specification.

As is well known, the ordinary flow meter comprising a pressure difference creating device which creates a pressure difference which bears a definite relation to the rate of flow and an instrument for measuring the pressure difference created, is adapted for measuring only steady flow and is not adapted for or at least is not accurate when used for measuring pulsating flow.

However, there are instances where it is desirable to measure pulsating flow, one such instance being in the case of reciprocating boiler feed pumps, and the object of my invention is to provide an improved construction and arrangement whereby a flow meter may be used to measure accurately the pulsating flow from such a pump.

For a consideration of what I consider to be novel and my invention, attention is directed to the accompanying description and the claims appended thereto.

Figure 1:
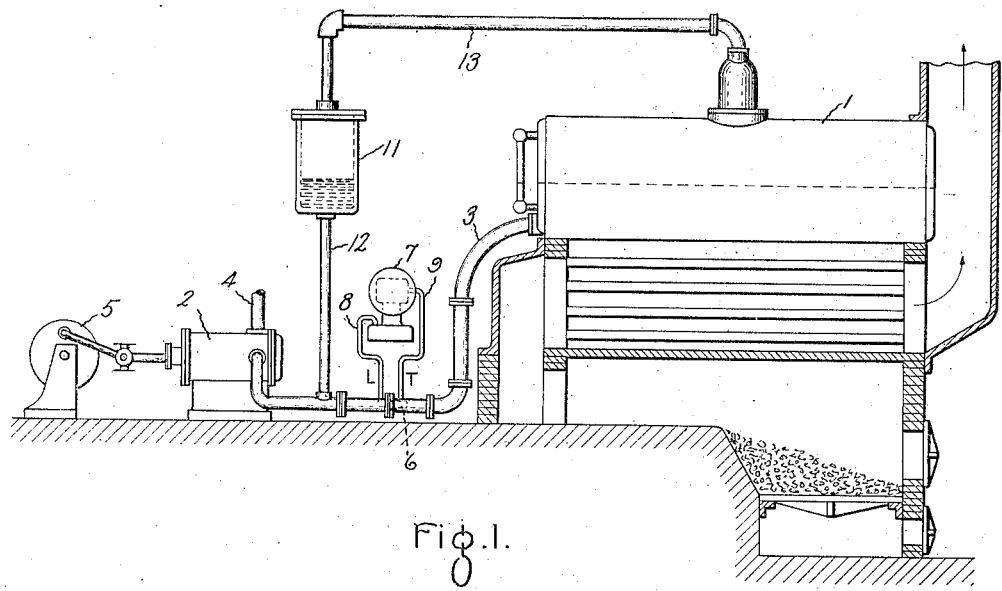
Figure 2:
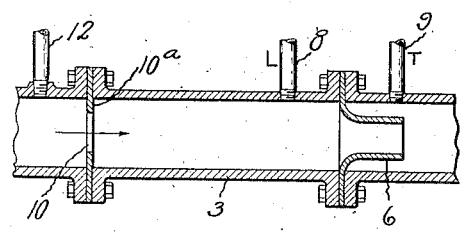

In the drawing, Fig. 1 is a diagrammatic view of an installation embodying my invention, and Fig. 2 is a detailed sectional view. Referring to the drawing, 1 indicates a steam boiler to which feed water is supplied by a reciprocating pump 2 through a conduit 3. The inlet pipe for the pump is indicated at 4 and the means for driving the pump is indicated at 5.

According to my invention, I install the flow meter itself in conduit 3 in the usual manner. A flow meter of any suitable type may be used. In the drawing, 6 indicates the pressure difference creating device of the flow meter, a known type usually termed a flow nozzle being shown, and 7 indicates the measuring instrument of the flow meter connected to the pressure difference creating device by the leading pressure pipe 8 and the trailing pressure pipe 9. A suitable distance in advance of flow nozzle 6 as regards the direction of flow of water, I provide an orifice 10 formed in an orifice plate 10$^a$ and in advance of orifice 10 I provide a surge tank 11 which is connected to conduit 3 by a pipe 12. The upper portion of surge tank 11 is connected by a pipe 13 to the steam space of boiler 1, so that the upper portion of the surge tank is filled with steam and is subjected to the pressure in the boiler.

Orifice 10 is of a size such that the drop in pressure through it is sufficient to force the surge or pulsation in the flow of water, due to the reciprocating action of the pump, up into surge tank 11 where it expends itself against the elastic action of the steam which fills the upper part of the tank. On the discharge stroke of the pump the water will rise in the surge tank to a height dependent on the drop in pressure produced by orifice 10, while during the suction stroke of the pump water will flow from tank 11 through the orifice to the boiler. As a result there will be a practically steady flow of water through flow nozzle 6 and hence the meter will measure correctly.

By connecting the top of the surge tank 11 to the steam space of the boiler I obtain the benefit of the elastic action of the steam in tank 11 during the discharge stroke of the pump, and I obtain also the result that the pressure in the surge tank is always a predetermined amount less than the discharge pressure of the pump, the amount being determined by the drop in pressure through orifice 10.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent in the United States is:—

In a flow meter installation for measuring the flow of water from a reciprocating pump to a boiler, the combination with the conduit through which the water flows to the boiler, of a flow meter installed in said conduit, means providing an orifice in advance of the flow meter as regards the direction of flow through the conduit for effecting a drop in pressure in the conduit in advance of the flow meter, a surge tank connected to the conduit in advance of said orifice means, and a pipe connecting the upper end of said surge tank to the steam space of the boiler.

In witness whereof, I have hereunto set my hand this 7th day of November, 1924.

CHARLES F. BULLOCK.